(12) United States Patent
Lord

(10) Patent No.: US 6,527,241 B1
(45) Date of Patent: Mar. 4, 2003

(54) APPARATUS FOR COOLING A LAPTOP COMPUTER

(75) Inventor: Charles Lord, Scottsdale, AZ (US)

(73) Assignee: Mobility Electronics Inc., Scottsdale, AZ (US)

( * ) Notice: Subject to any disclaimer, the term of this patent is extended or adjusted under 35 U.S.C. 154(b) by 0 days.

(21) Appl. No.: 09/988,694

(22) Filed: Nov. 20, 2001

(51) Int. Cl.$^7$ .............................................. B65D 19/00
(52) U.S. Cl. ............................. 248/346.01; 248/346.05
(58) Field of Search ..................... 248/346.01, 346.5, 248/678, 917, 918, 441.1

(56) References Cited

U.S. PATENT DOCUMENTS

| | | | | |
|---|---|---|---|---|
| 4,624,433 A | * | 11/1986 | Henneberg | 248/346 |
| 4,852,498 A | * | 8/1989 | Judd | 108/43 |
| D359,179 S | * | 6/1995 | Cucinotta | D6/449 |
| 5,503,361 A | * | 4/1996 | Kan-O et al. | 248/688 |
| 5,607,054 A | * | 3/1997 | Hollingsworth | 206/320 |
| 5,623,869 A | * | 4/1997 | Moss et al. | 108/43 |
| 5,678,800 A | * | 10/1997 | Markussen | 248/346.01 |
| 5,927,669 A | * | 7/1999 | Sassman | 248/346.01 |
| 6,123,309 A | * | 9/2000 | Sage | 248/316.1 |
| 6,152,414 A | * | 11/2000 | Jandrow | 248/346.03 |

* cited by examiner

Primary Examiner—Ramon O. Ramirez
Assistant Examiner—Kofi Schulterbrandt
(74) Attorney, Agent, or Firm—Jackson Walker LLP

(57) ABSTRACT

The present invention provides an apparatus adapted to angle and space a laptop computer above a surface. The apparatus is a laptop stand and comprises a concave member having a first portion and a second portion adapted to receive a laptop computer. The first portion is at a height which is substantially higher than the second portion so as angle the laptop as it lies atop the stand. The invention cantilevers the laptop to advantageously cool the laptop at a greater rate than if the laptop were directly in contact with a surface, such as a desk top, and, simultaneously, provides laptop users with a more user-friendly angle from which to operate the laptop keyboard.

16 Claims, 2 Drawing Sheets

APPARATUS FOR COOLING A LAPTOP COMPUTER

This invention is related to and claims priority under 35 U.S.C. §119(e)(1) from the following co-pending U.S. Provisional Patent Application: Ser. application No. 60/324,772 by Charles Lord, entitled, "Notebook Computer Cooling Apparatus" and filed on Sep. 25, 2001. The aforementioned patent application is hereby incorporated by reference.

FIELD OF THE INVENTION

The present invention is generally related to the field of laptop computers, and more particularly to an apparatus for supporting and cooling a laptop computer.

BACKGROUND OF THE INVENTION

As the laptop computer has miniaturized into what is now termed the sub-notebook, notebook, new materials have begun to replace plastics material in many of these newer laptop computers. Among these materials are injectable metals, such as metal alloys. These metal alloys allow designers to reduce the wall thickness of the laptop enclosure by one-third to one-half that of plastic enclosures while still retaining the same or better structural properties. However, these injection metals retain heat longer than their plastic counterparts. In many instances, the laptop itself becomes very hot to the touch, making it uncomfortable to use after a short period of time. Although the internal components of the laptop may be operating within the specified temperature tolerances, they would have a much greater life span if the temperature were reduced significantly.

Generally, one method of cooling the laptop has been to slightly elevate it above a surface using adjustable legs which are typically integrally positioned underneath the laptop and are used to prop up the laptop to provide for better airflow. However, in a rush to maximize space, laptop manufacturers have gradually eliminated these adjustable legs. Moreover, by removing these adjustable legs, the laptop user is prevented from gaining a more user-friendly angle when using the laptop keyboard. The American Standard For Human Factors Engineering of Visual Terminal Display Workstations in section 7.3 recommends and angle between 0 and 15 degrees for optimal user comfort.

Accordingly, there exists a need for an apparatus that facilitates the improved flow of cool air under a laptop computer for cooling thereof. This apparatus would induce cooling of the laptop at a much higher rate than if the laptop were in contact with a flat surface, especially for today's newer laptop computers which are constructed out of newer material that are heat retentive. Such an apparatus would also advantageously improve the ergonomics of the laptop's user interface, i.e., keyboard, making it easier for users to use the laptop without any added physical strain.

SUMMARY OF THE INVENTION

The present invention achieves the technical advantages as an apparatus adapted to angle and space a laptop computer above a surface to facilitate the cooling thereof. Advantageously, the present invention improves the usable life span of the laptop by allowing the processor and fan disposed therein to operate at much more efficient temperature ranges. Moreover, the invention advantageously angles the laptop above a surface so as to improve the ergonomics of the laptop keyboard so as to reduce hand, neck, and back strains.

In one embodiment, the invention is laptop computer stand which comprises a member having a first portion and a second portion. The first portion is set at first predetermined height and the second portion is at second predetermined height which is significantly higher than the first height. Both first and second portions include a least two contact surfaces adapted to be in direct contact with the bottom surface of the laptop and to angle the laptop above the surface. Moreover, as the laptop is positioned to the support structure, having a concave upper surface, and an air channel is formed between the laptop computer and the computer stand, so as to permit air flow for cooling the laptop.

In another embodiment, the laptop stand includes a turntable such that a laptop user may conveniently rotate the laptop in a myriad of different positions, allowing the laptop display to be displayed to mutiple viewers from a fixed point on a desktop.

BRIEF DESCRIPTION OF THE DRAWINGS

Advantages of the invention and the specific embodiments will be understood by those of ordinary skill in the art by reference to the following detailed description of preferred embodiments taken in conjunction with the drawings, in which.

DETAILED DESCRIPTION OF PREFERRED EMBODIMENTS

The numerous innovative teachings of the present applications will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Figure 1:
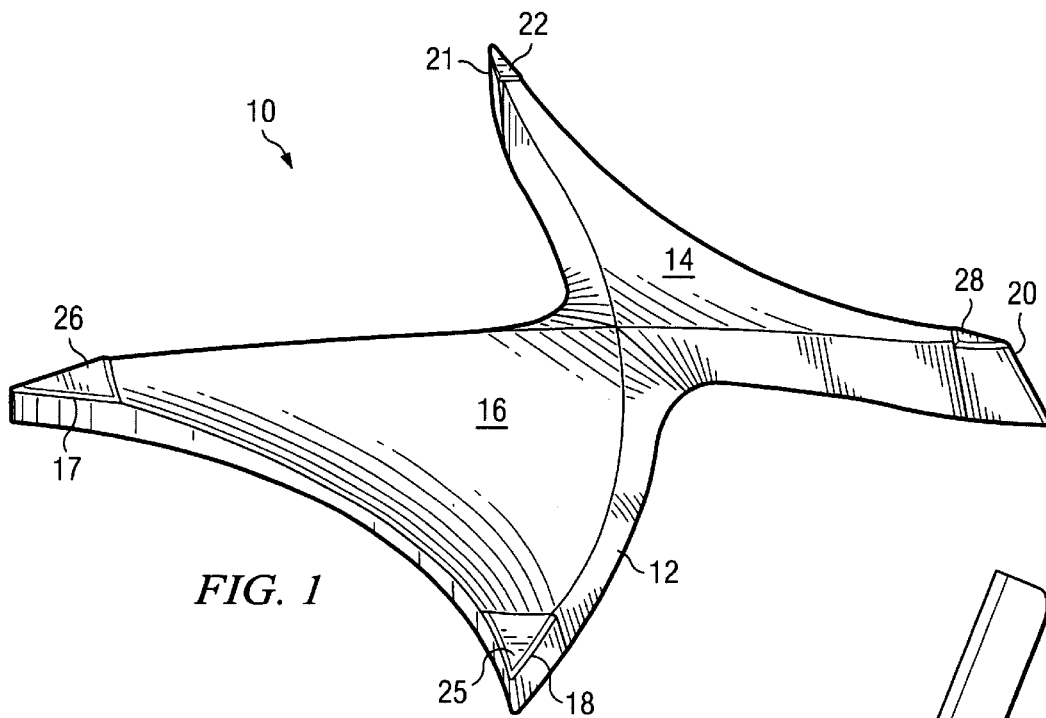
FIG. 1 illustrates a perspective view of a laptop computer stand having four contact points and adapted to elevate and angle the notebook computer above a surface in accordance with the present invention.

FIG. 1 illustrates a perspective view of a laptop computer stand 10 in accordance with the present invention. In one preferred embodiment, the laptop stand 10 comprises an integral member 12 made of molded plastic having a first portion 14 and an opposing second portion 16. The first portion 14 has tips set preferably at a first predetermined height which is significantly higher than the height of the second portion 16 tips so as to angle a laptop computer 32 lying thereon, as depicted later in FIG. 2.

Both first portion 14 and second portion 16 include contact surfaces 20 and 22 as well as 17 and 18, respectively. These contact surfaces are formed at the distant ends or tips of the respective members, and are spaced apart and directly in contact with the underneath surface of the laptop 32 so as to stabilize the laptop 32. These contact surfaces also include rubber pads 25 and 26 as well as 27 and 28 which are coupled thereto, for gripping the underneath surface of the laptop 32 so as to prevent the laptop 32 from needlessly shifting as a user uses the laptop keyboard 30. It should be understood that although four contact surfaces are illustrated, the invention may be designed to incorporate any number of contact surface or point, such as 6 or 8, to allow for greater stability. The first and second portions 14 and 16 collectively from a concave surface maximizing the space there between with the supported computer 32.

Figure 2:
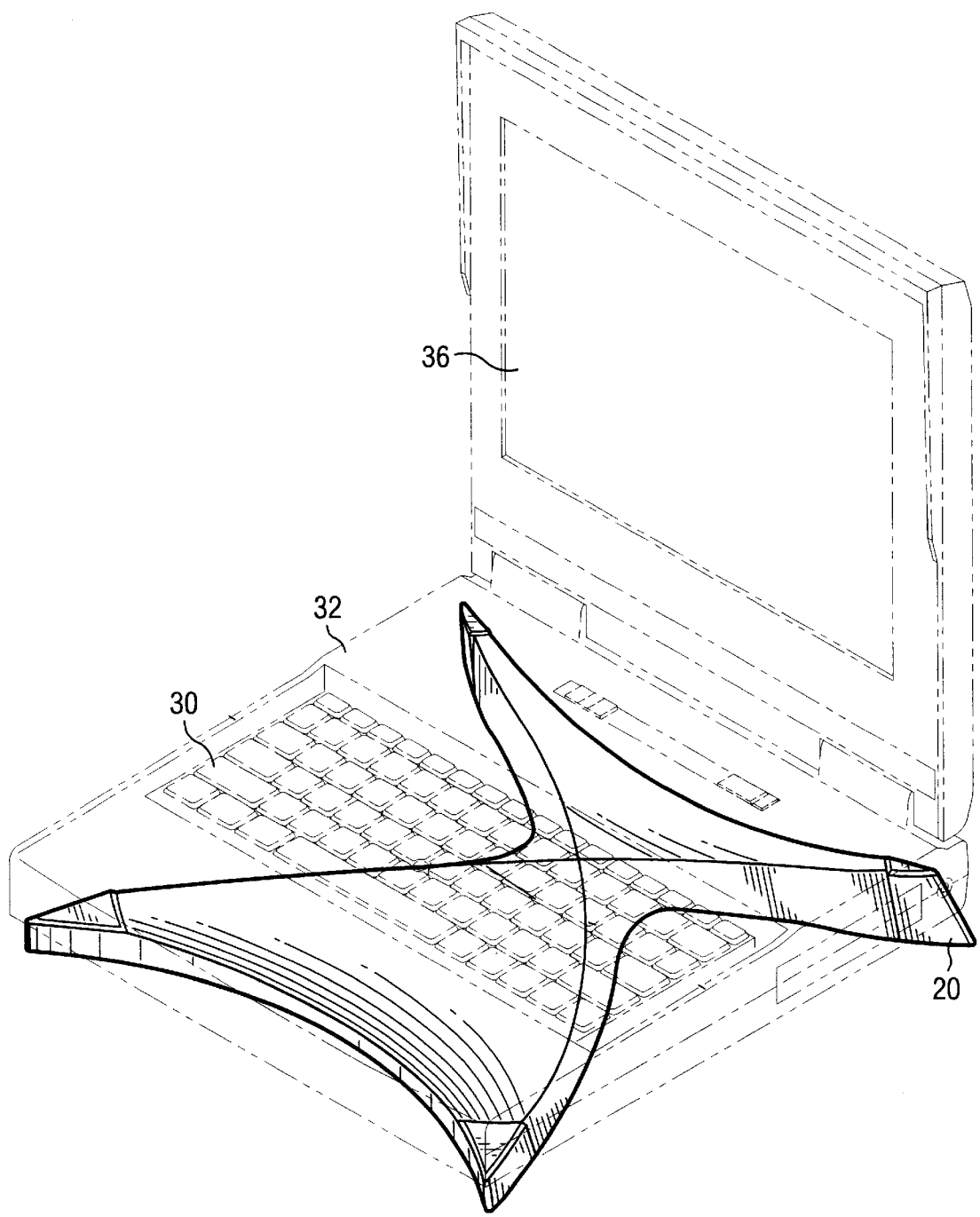
FIG. 2 is a perspective view of the laptop stand with a notebook computer disposed thereon.

FIG. 2 is a perspective view of the laptop stand 10 with a laptop computer 32 disposed thereon. Preferably, first portion 14 and second portion 16 of member 12 are configured to form a geometrically, X-shaped laptop stand. Even though the present invention is uniquely configured as a concave X-shaped laptop stand, any number of different geometric shapes may be used—such as an H-shape, for example—to elevate and stabilize the laptop 32 above a surface. As shown, the stand 10 is adopted to support the laptop 32 so as to maximize airflow to the exposed bottom surface of laptop 32.

Figure 3:
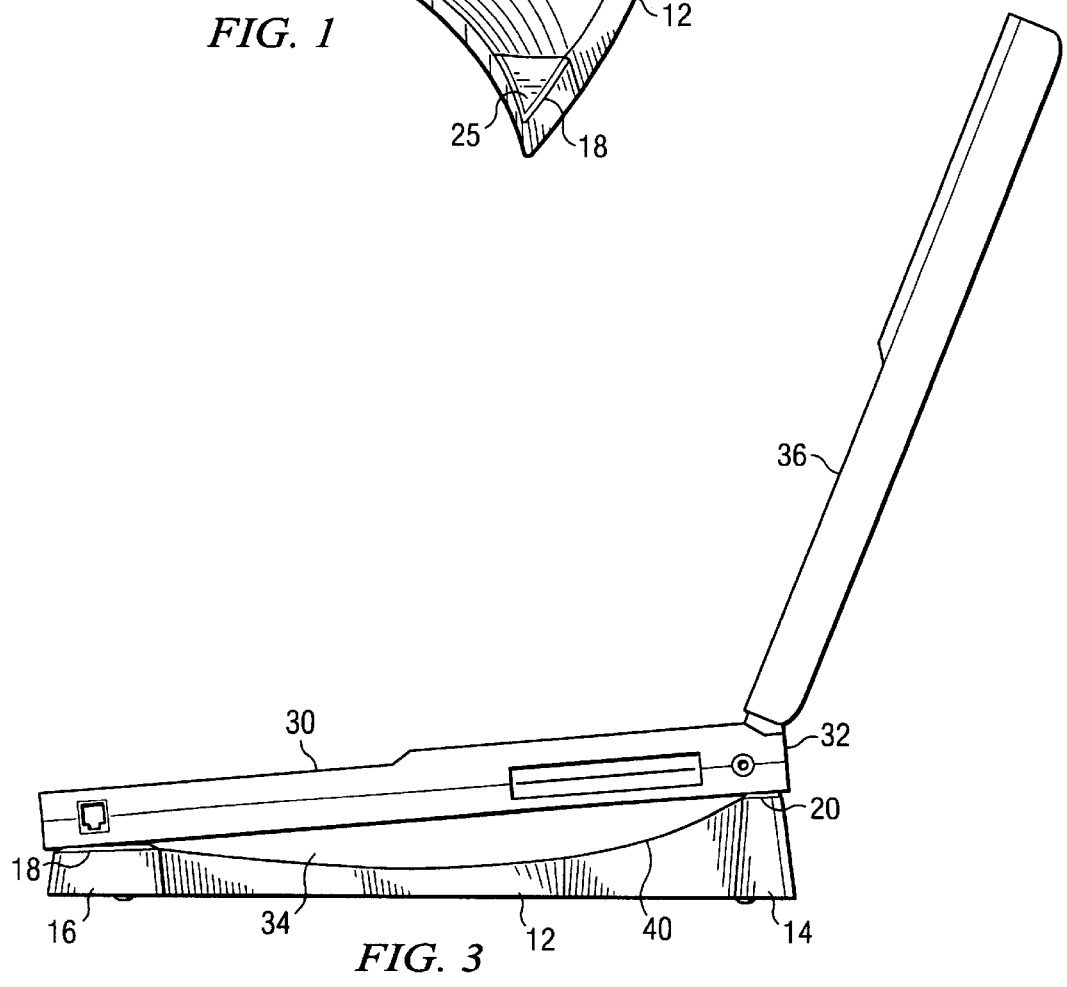
FIG. 3 is a side view of FIG. 2 wherein an air channel is created between the concave laptop stand and the supported laptop computer to facilitate the flow of air therethrough.

Still referring to FIG. 2, contact surfaces are arranged underneath the substantially, square-shaped laptop 32 to space the laptop 32 above a surface, allowing the laptop 32 to dissipate heat at a much greater rate than if the laptop 32 were directly in contact with a flat surface, such as a desk top. Moreover, these contact surface are located proximate the four corners of the laptop 32 creating a firm and stable foundation even when the laptop. is slightly angled, as depicted in FIG. 3. Here, the present invention advantageously elevates the laptop 32 to allow the processor and the fan located therein (not shown) to operate more efficiently at different temperature ranges.

Referring to FIG. 3, there is shown a side view of the laptop computer stand 10 as depicted in FIG. 2. Incidentally, air channel 34 is formed between a concave surface 40 of member 12 and laptop 32 which facilitates the flow of air therethrough, allowing for enhanced cooling of the laptop 32 and the electrical components located therein (not shown). As shown in greater detail in FIG. 3, contact surfaces 20 and 22 are set higher than surfaces 17 and 18 to angle the laptop 32, forming a more user-friendly angle from which a user is able to manipulate the laptop keyboard 30. It should be understood that although the laptop computer 32 is positioned atop the laptop stand 10 at a five degree angle relative to the surface, the invention may be designed to position the laptop computer 32 in any number of different angles.

In another alternative embodiment, the laptop stand 10 may be adapted to incorporate a turntable for rotating the laptop 32 when a user applies a slight angular force along the edge of the turntable or the laptop 32. In this instance, the turntable is adapted to add to the ergonomic features of the laptop stand 10 by allowing users to conveniently rotate the laptop keyboard 30 and display 36 from a multitude stationary positions.

Though the invention has been described with respect to specific preferred embodiments, many variations and modifications will become apparent to those skilled in the art upon reading the present application. It is therefore the intention that the appended claims be interpreted as broadly as possible in view of the prior art to include all such variations and modifications.

What is claimed is:

1. A laptop computer stand, comprising:

a member having a first portion and a second portion, said first portion having a first height, said second portion having a second height which is substantially higher than said first height;

wherein said member is adapted to receive a laptop computer so as to both angle and space said laptop above a surface to facilitate the cooling thereof, wherein said member is concave and opening upward to create space below the supported laptop computer.

2. The apparatus of claim 1 wherein said first portion comprises at least two contact surfaces.

3. The apparatus of claim 2 wherein said second portion comprises at least two contact surfaces.

4. The apparatus of claim 3 wherein said contact surfaces have rubber pads coupled thereto.

5. The apparatus of claim 2 wherein said contact surfaces have rubber pads coupled thereto.

6. The apparatus of claim 1 wherein said member is an integral member made of molded plastic.

7. The apparatus of claim 1 wherein said angle is a five degree angle.

8. The apparatus of claim 1 wherein said member generally has the shape of an "X".

9. In combination:

a notebook computer; and a stand having a member having a first and second portion supporting the notebook computer at an angle, wherein said member is concave and opens upward to create space below the supported laptop computer.

10. The apparatus of claim 9 wherein said first portion comprises at least two contact surfaces.

11. The apparatus of claim 10 wherein said contact surfaces have rubber pads coupled thereto.

12. The apparatus of claim 9 wherein said second portion comprises at least two contact surfaces.

13. The apparatus of claim 12 wherein said contact surfaces have rubber pads coupled thereto.

14. The apparatus of claim 9 wherein said first and second portion is an integral member made of molded plastic.

15. The apparatus of claim 9 wherein said angle is a five degree angle.

16. The apparatus of claim 9 wherein said member generally has the shape of an "X".

* * * * *

(12) INTER PARTES REEXAMINATION CERTIFICATE (1098th)
United States Patent
Lord

(10) Number: US 6,527,241 C1
(45) Certificate Issued: Apr. 30, 2015

(54) APPARATUS FOR COOLING A LAPTOP COMPUTER

(75) Inventor: Charles Lord, Scottsdale, AZ (US)

(73) Assignee: IGO, INC., Scottsdale, AZ (US)

Reexamination Request:
No. 95/001,357, Jun. 14, 2010

Reexamination Certificate for:
Patent No.: 6,527,241
Issued: Mar. 4, 2003
Appl. No.: 09/988,694
Filed: Nov. 20, 2001

(51) Int. Cl.
*G06F 1/16* (2006.01)
*G06F 1/20* (2006.01)
*A47B 23/04* (2006.01)

(52) U.S. Cl.
CPC ........... *G06F 1/203* (2013.01); *A47B 2023/049* (2013.01)

(58) Field of Classification Search
None
See application file for complete search history.

(56) References Cited

To view the complete listing of prior art documents cited during the proceeding for Reexamination Control Number 95/001,357, please refer to the USPTO's public Patent Application Information Retrieval (PAIR) system under the Display References tab.

*Primary Examiner* — Sara Clarke

(57) ABSTRACT

The present invention provides an apparatus adapted to angle and space a laptop computer above a surface. The apparatus is a laptop stand and comprises a concave member having a first portion and a second portion adapted to receive a laptop computer. The first portion is at a height which is substantially higher than the second portion so as angle the laptop as it lies atop the stand. The invention cantilevers the laptop to advantageously cool the laptop at a greater rate than if the laptop were directly in contact with a surface, such as a desk top, and, simultaneously, provides laptop users with a more user-friendly angle from which to operate the laptop keyboard.

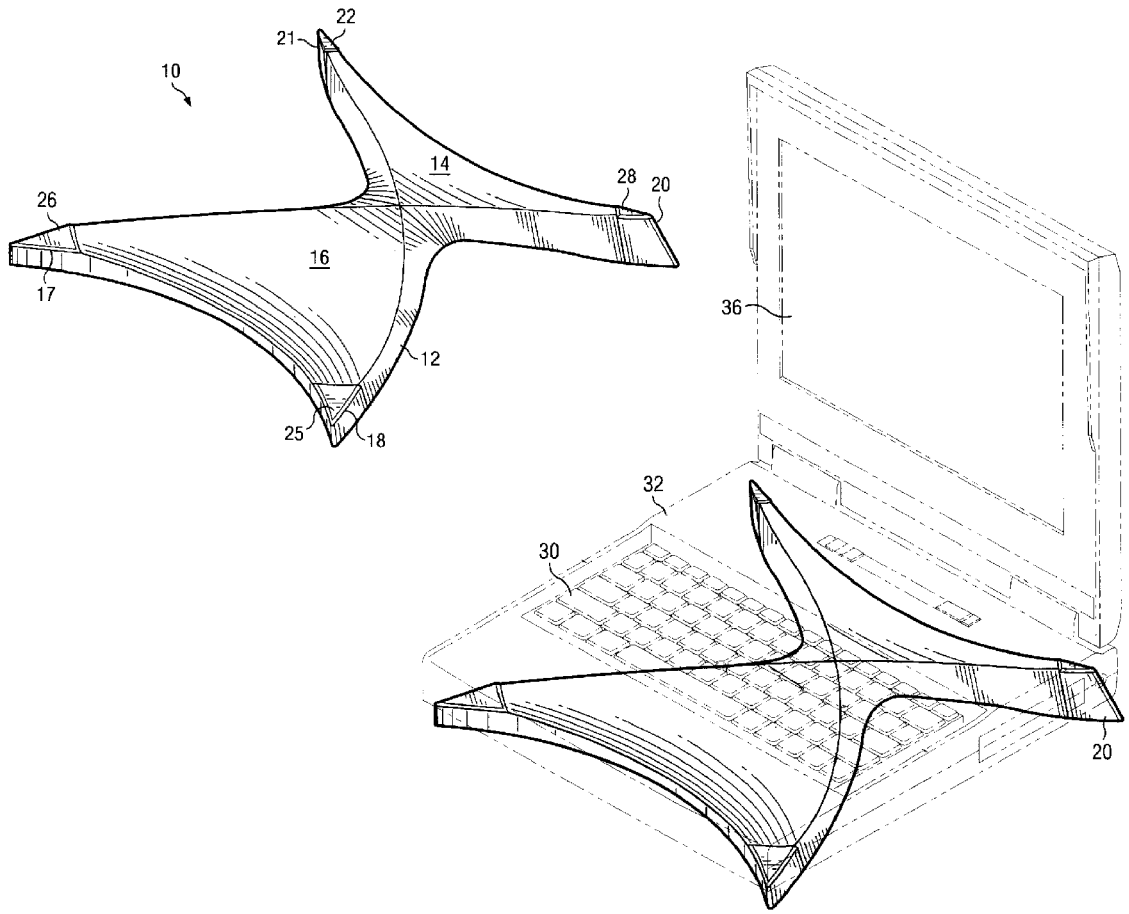

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-16 is confirmed.

* * * * *